United States Patent [19]

Kawecki

[11] 4,204,588
[45] May 27, 1980

[54] WHEELCHAIR BRAKING APPARATUS

[76] Inventor: Henry E. Kawecki,
Tabernacle-Medford Lakes Rd.,
Vincentown, N.J. 08088

[21] Appl. No.: 951,774

[22] Filed: Oct. 16, 1978

[51] Int. Cl.² .............................................. B60T 1/00
[52] U.S. Cl. .............................. 188/2 F; 188/106 R; 280/242 WC
[58] Field of Search .................. 188/2 F, 109, 106 R, 188/2 D, 24; 280/242 WC; 297/DIG. 4

[56] References Cited

U.S. PATENT DOCUMENTS

| | | | |
|---|---|---|---|
| 2,426,451 | 8/1947 | Hammack | 188/2 F |
| 3,529,700 | 9/1970 | Marshall | 188/109 |
| 3,679,257 | 7/1972 | Jacuzzi et al. | 297/DIG. 4 X |
| 3,941,215 | 3/1976 | Schoch | 188/24 |

*Primary Examiner*—Douglas C. Butler
*Attorney, Agent, or Firm*—Martin Sachs

[57] ABSTRACT

An auxiliary wheelchair braking apparatus includes a bracket adapted to be affixed to the frame of the wheelchair proximate each primary wheel thereof and utilizes caliper type braking device disposed on the bracket, one arm of the calipers being disposed on either side of the primary wheel. Activating levers are disposed proximate the backrest of the wheelchair for easy access by the elbows of the person making use thereof. Each of the activating levers are operatively coupled to the braking device for activation thereof. Pressure exerted on the activating levers forces the braking device to come into contact with the primary wheels responsive to the amount of pressure exerted on the activating lever.

5 Claims, 2 Drawing Figures

WHEELCHAIR BRAKING APPARATUS

BACKGROUND OF THE INVENTION

1. Field of the Invention

The present invention relates to wheelchairs and in particular to an auxiliary wheelchair braking apparatus which enables a person sitting in the wheelchair to readily perform auxiliary braking functions.

2. Description of the Prior Art

The prior art abounds with various types of braking mechanisms associated with wheelchairs. Typical of such a device is the U.S. Pat. No. 3,529,700 issued to Marshall which discloses a wheelchair brake assembly that includes spring loaded brake elements mounted on the main frame of a wheelchair. The brake assembly is biased into an engagement with the primary or major wheels. The elements are disengaged from the wheels in response to a seat control linkage or manually operable means. The weight of an individual sitting on the seat of the wheelchair releases the brake mechanism from engagement, or alternatively a person deciding to push the wheelchair may release the braking mechanism by pressure on the hand lever which is disposed proximate the hand grip. However, the person sitting in the wheelchair is unable to conveniently operate the brakes to control acceleration or degree of movement. The actual braking mechanism disclosed therein is a lever which comes into contact with both wheels of the wheelchair.

The U.S. Pat. No. 2,782,870 issued to Sill discloses a braking mechanism which comes into contact with the tires of the wheelchair and is activated by a lever and an eccentric cam arrangement. Here again, the braking mechanism is not readily operable by the individual sitting in the wheelchair, and is mainly utilized to keep the chair stationary while entering upon or alighting from the chair.

The U.S. Pat. No. 3,941,215 issued to Schoch is typical of a bicycle brake adjusting apparatus which is in the form of a caliper. This type of brake is similar to that suggested for use in the present invention.

Although braking devices have been in use on wheelchairs for many years, their main function has been to hold the wheelchair stationary during the alighting or leaving thereof by the invalid who uses the chair.

Therefore, it is an object of the present invention to provide an improved braking apparatus for a wheelchair which permits additional novel braking functions.

It is a further object of the present invention to provide a braking apparatus for a wheelchair which may be activated by the individual utilizing the wheelchair.

It is a further object of the present invention to provide a wheelchair braking apparatus which may be readily affixed to wheelchairs presently in use.

Another object of the present invention is to provide a braking apparatus which may be utilized on a wheelchair which permits proportional braking thereof, thus enabling an individual confined to a wheelchair to be able to move on inclined surfaces.

Yet another object of the present invention is to provide an auxiliary braking apparatus which may be affixed to conventional wheelchairs, is relatively inexpensive and easily installed.

SUMMARY OF THE INVENTION

In a wheelchair having armrests, a pair of large primary wheels, a seat and backrest, a frame, a hand-operated lever braking means affixed to the frame for locking the primary wheels, the improvement comprises, according to the principles of the present invention, bracket means affixed to the frame proximate each primary wheel, braking means disposed on the bracket means, the braking means being disposed proximate each of the primary wheels and adapted to come into contact therewith when activated, and activating means disposed on the wheelchair arms proximate the backrest for easy access by the elbows of a person sitting in the seat of the wheelchair, each of the activating means being operatively coupled to the braking means for activation thereof, causing the braking means to increase its contact with each of the primary wheels in response to the pressure exerted on the activating means.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is therefore not to be taken in a limiting sense and the scope of the present invention is best defined by the appended claims.

BRIEF DESCRIPTION OF THE DRAWING

In order that the invention may be more fully understood, it will now be described by way of example, with reference to the accompanying drawing, in which.

DESCRIPTION OF THE PREFERRED EMBODIMENTS

Figure 1:
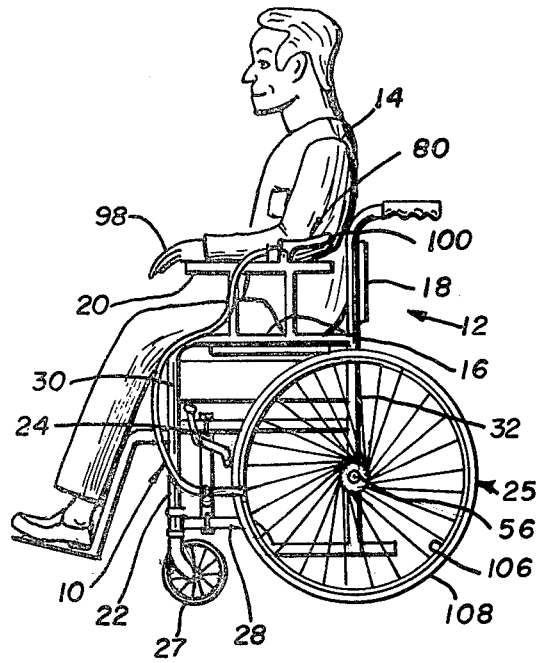
FIG. 1 is a side view in elevation of a wheelchair with a patient thereon, having the braking apparatus installed for use.
Figure 2:
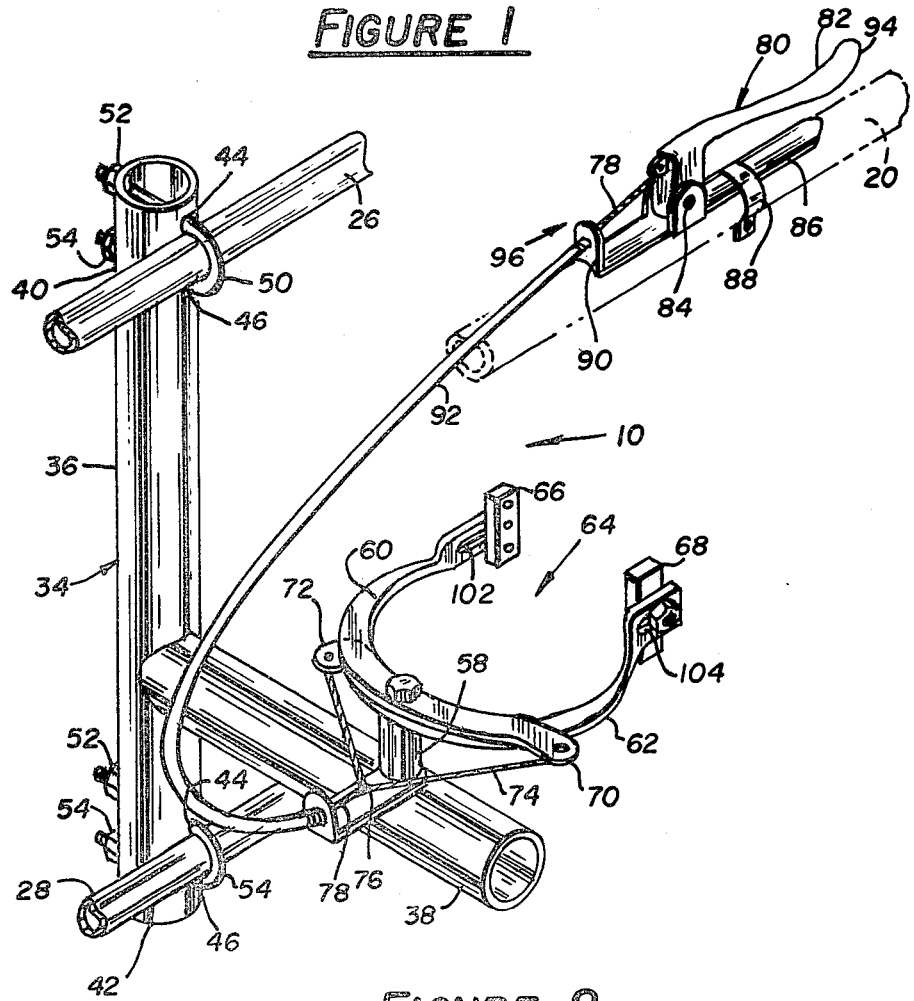
FIG. 2 is a much enlarged perspective illustration of the wheelchair braking attachment, according to the principles of the present invention.

The wheelchair braking apparatus 10 is shown in FIG. 1 installed on a wheelchair 12 with an individual 14 sitting on the seat portion 16 thereof. The wheelchair 12 may be of the conventional type and includes a backrest 18, armrest 20, a frame 22, a hand-operated braking device 24 which may be operated by the individual seated in the chair or another person assisting him. The braking device 24 is used to lock the primary wheels 25 enabling an individual to alight on the wheelchair 12 or enable the individual to be removed therefrom, without having the chair 12 slip from beneath him. The wheelchair 12 further includes secondary wheels 27 which rotate 360 degrees enabling the wheelchair 12 to be turned or directed as desired.

The wheelchair 12 is provided with a pair of cross braces 26 and 28 which extend from the front upright member 30 to the rear upright member 32 and functions to brace the wheelchair 12 in order to support the weight of an individual sitting thereon.

According to the principles of the present invention, a bracket 34 is provided which includes an upright portion 36 and a horizontal portion 38. The vertical or upright portion 36 is dimensioned to span the distance between cross braces 26 and 28 and is provided at its extremities 40 and 42 with a pair of holes 44 and 46 adapted to receive U-bolts 48 and 50 therein. In assembling the bracket 34 to the wheelchair 12, the U-bolts 48 and 50 circumscribe cross braces 26 and 28 and by means of nuts 52 and 54 which threadedly engage the extremities of the U-bolts 50 and 54, affix the bracket 34 rigidly to the wheelchair 12.

The horizontal portion 38 of bracket 34 is preferably welded to the upright portion 36 and extends outwardly therefrom beyond the primary wheels 25 and parallel to the axle 56 used for mounting the primary wheels 25. A vertical pivot point 58 is provided on the horizontal portion 38 of bracket 34 directly in line and proximate to primary wheel 25. A conventional two arm 60 and 62 caliper brake 64 having brake pads 66 and 68 affixed on the extremities thereof is adapted to be mounted on pivot point 58. Each arm is provided with extending tabs 70 and 72 which has a wire 74 affixed therein, in a conventional manner. The wire 74 is affixed to the tabs 72 and 70, in a conventional manner, and is provided with a centrally disposed tab 76 which has a control wire 78 affixed thereon. The other end of wire 78 extends to a remotely located activating device 80 which includes a pivotal lever arm 82, one end of which is connected to wire 78. The pivot point 84 of lever arm 82 is provided on a base mounting bracket 86 which is held on to the armrest 20 of the wheelchair 12 by means of a strap 88 in a conventional manner. The bracket 86 is also provided with a retaining device 90 at one end thereof, which holds the outer portion 92 of wire 78 in position. Pressure exerted on end 94 of lever 82 to the right of pivot point 84 will cause the wire 78 to be pulled in the direction of arrow 96 thus activating the caliper brake 64 which has each arm 60 and 62 disposed on either side of the primary wheel 25. Although one caliper brake 64 is shown, it is understood that one brake is provided for each primary wheel.

In operation, an individual 14 sitting on the wheelchair 12 who is unable to make use of his hands or distal extremities 98 is still capable of activating the braking apparatus 10 by utilizing his elbow 100. By using pressure of the elbow 100 on the end portion of lever 82 the wire 78 will cause tensioning of wire 74, thus causing the arm 60 and 62 of caliper brake 64 to rotate about pivot 58, thereby, moving the brake pads 66 and 68 in contact with the primary wheel 25 of the wheelchair 12. The brake pads 66 and 68 are provided with a means for adjustment by the slots 102 and 104 provided in arms 60 and 62, respectively, of the caliper brake 64. This permits the adjustment of the brake pads 66 and 68 to come into contact with the rim of primary wheel 25 or the tire 108 thereof. Thus, the amount of use to be given to the brake and the purpose for which it is to be used may be readily accommodated.

It is contemplated that individuals that do not have use of their hands may utilize this type of braking system. However, it also has many advantages for those who have use of their complete arm function, by permitting an additional braking device to be used by a person's elbow. For example, in a wheelchair rolling down an inclined plane there is no means at present for an individual to control the speed with which the rolling occurs. With the use of the present invention, the individual sitting on the wheelchair is fully capable of controlling the descent on an inclined plane without the use of another individual. During wheelchair sports, when rapid maneuvers, sudden braking and turning become necessary, or when one's hands have to be free to direct a ball, the ability to provide braking by using the elbows is a tremendous asset. This ability will give a player considerable advantage over one who is required to use his hands in order to turn and brake his wheelchair while attempting to hold on to a ball.

Hereinbefore, has been disclosed an auxiliary wheelchair braking apparatus which may be used by individuals who are unable to make use of their hands or may be utilized by those individuals participating in certain sports while confined to a wheelchair. It will be understood that various changes in details, materials, arrangement of parts and operating conditions which have been herein described and illustrated in order to explain the nature of the invention, may be made by those skilled in the art within the principles and the scope of the present invention.

Having thus set forth the nature of the invention, what is claimed is:

1. In a wheelchair, having a pair of armrests, a pair of large primary wheels, a seat, a backrest, a frame, a hand-operated lever brake affixed to said frame for locking said primary wheels, the improvement of auxiliary braking means comprising:
   (a) bracket means affixed to said frame proximate each primary wheel;
   (b) braking means disposed on each said bracket means, said braking means being disposed proximate each said primary wheel and adapted to come into contact therewith when activated; and
   (c) activating means disposed on each said wheelchair armrests proximate said backrest for easy access by the elbows of a person sitting in said seat, each said activating means being operatively coupled to said braking means for activation thereof, causing said braking means to increase its contact with each said primary wheel in response to the pressure exerted on said activating means.

2. In a wheelchair according to claim 1 wherein said braking means is of the caliper type having one arm thereof disposed on either side of said primary wheel and adapted to proportionately come into contact therewith in response to increasing pressure on said activating means.

3. In a wheelchair according to claim 1 wherein said activating means includes a pivotal lever arm, pressure exerted on one end of said lever arm causing said braking means to engage said primary wheel responsive to the pressure applied thereto.

4. An auxiliary braking apparatus for a wheelchair having a frame, a backrest, armrests, a seat and a pair of large primary wheels, comprising:
   (a) bracket means adapted to be affixed to the frame of said wheelchair proximate each primary wheel thereof;
   (b) caliper type braking means disposed on said bracket means, one arm of each caliper braking means being disposed on either side and proximate to each said primary wheel and adapted to come into contact therewith when activated; and
   (c) activating means disposed on each armrest proximate the backrest of said wheelchair for easy access by the elbows of a person sitting in said wheelchair seat, each said activating means being operatively coupled to said braking means for activation thereof, causing said braking means to increase its contact with each said primary wheel in response to the pressure exerted on said activating means.

5. An auxiliary wheelchair braking means according to claim 4 wherein said activating means includes a pivotal lever arm, pressure exerted on one end of said lever arm causing said braking means to engage each said primary wheel responsive to the pressure applied thereto.

* * * * *